(12) United States Patent
Ijzerman et al.

(10) Patent No.: US 8,902,284 B2
(45) Date of Patent: Dec. 2, 2014

(54) DETECTION OF VIEW MODE

(75) Inventors: Wilbert Ijzerman, Eindhoven (NL); Peter-Andre Redert, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1914 days.

(21) Appl. No.: 11/573,281

(22) PCT Filed: Jul. 28, 2005

(86) PCT No.: PCT/IB2005/052547
§ 371 (c)(1),
(2), (4) Date: Feb. 6, 2007

(87) PCT Pub. No.: WO2006/016315
PCT Pub. Date: Feb. 16, 2006

(65) Prior Publication Data
US 2008/0043094 A1 Feb. 21, 2008

(30) Foreign Application Priority Data
Aug. 10, 2004 (EP) .................................... 04103855

(51) Int. Cl.
*H04N 13/00* (2006.01)
*H04N 13/04* (2006.01)
*H04N 19/597* (2014.01)

(52) U.S. Cl.
CPC ....... *H04N 13/0456* (2013.01); *H04N 13/0497* (2013.01); *H04N 19/00769* (2013.01); *H04N 13/0454* (2013.01)
USPC .............................................. 348/43; 348/51

(58) Field of Classification Search
CPC .......... H04N 13/0022; H04N 13/0048; H04N 13/0454; H04N 13/0456; H04N 13/0497; H04N 19/00769; H04N 2013/0081; H04N 2213/003; H04N 2213/005
USPC ....................................................... 348/43, 51
See application file for complete search history.

(56) References Cited

U.S. PATENT DOCUMENTS 5,737,032 A * 4/1998 Stenzel et al. ................ 348/649
5,986,804 A   11/1999 Mashitani et al.
(Continued)

FOREIGN PATENT DOCUMENTS

| EP | 0540137 A | 5/1993 |
| EP | 0963122   | 12/1999 |

(Continued)

OTHER PUBLICATIONS

Fehn, Christoph. "A 3D-TV System Based on Video Plus Depth Information." Conference Record of the Thirty-Seventh Asilomar Conference on Signals, Systems and Computers, 2003. Nov. 9-12, 2003. pp. 1529-1533.*

(Continued)

*Primary Examiner* — Christopher Biagini

(57) ABSTRACT

A switchable display device which is arranged to switch a portion of the display device between a single-view mode and a multi-view mode is disclosed. The display device includes: a processor to receive an information signal, the information signal having a format comprising structured elements corresponding to pixels, having respective luminance values and corresponding distance indicators; light generating unit to generate using of the information signal; optical unit to transfer the generated light in dependence of an actual view mode of the portion of the display device, the actual view mode being either the single-view mode or the multi-view mode; and wherein the processor detects the actual view mode of the portion of the display device using the respective distance indicators, and wherein the distance indicators are used for switching between the single-view and multi-view mode.

7 Claims, 5 Drawing Sheets

(56) References Cited

U.S. PATENT DOCUMENTS

Figure 1:
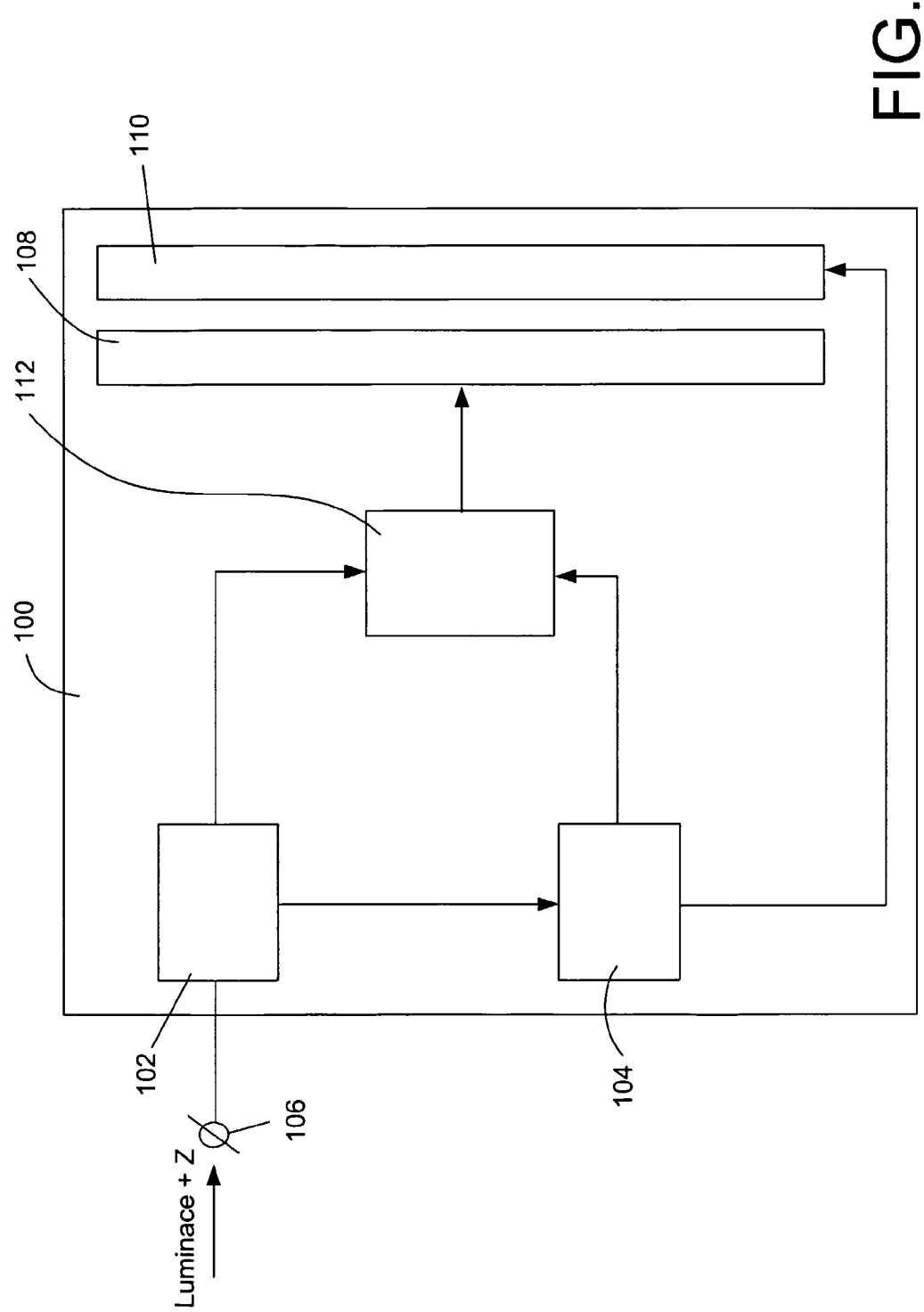

| | | | |
|---|---|---|---|
| 6,023,277 A * | 2/2000 | Osaka et al. | 345/419 |
| 6,064,424 A | 5/2000 | van Berkel et al. | |
| 6,100,862 A | 8/2000 | Sullivan | |
| 6,226,006 B1 * | 5/2001 | Collodi | 345/426 |
| 6,348,917 B1 * | 2/2002 | Vaswani | 345/418 |
| 6,614,927 B1 * | 9/2003 | Tabata | 382/154 |
| 7,050,020 B2 * | 5/2006 | Uehara et al. | 345/6 |
| 8,325,196 B2 | 12/2012 | Berretty et al. | |
| 2003/0035001 A1 | 2/2003 | Van Geest et al. | |
| 2006/0143020 A1 | 6/2006 | Zaima | |

FOREIGN PATENT DOCUMENTS

| | | |
|---|---|---|
| EP | 1168852 | 1/2002 |
| JP | 07236164 A | 1/1996 |
| JP | 8182023 A | 7/1996 |
| JP | 10074267 A | 3/1998 |
| WO | 2003015424 A2 | 2/2003 |
| WO | 03058556 A1 | 7/2003 |

OTHER PUBLICATIONS

Fehn, Christoph. "Depth-Image-Based Rendering (DIBR), Compression and Transmission for a New Approach on 3D-TV." Stereoscopic Displays and Virtual Reality Systems XI. Edited by Woods, Andrew J.; Merritt, John O.; Benton, Stephen A.; Bolas, Mark T. Proceedings of the SPIE, vol. 5291, pp. 93-104. May 2004.*

Redert, Andre et al "Synthesis of Multi-Viewpoint Images at Non-Intermediate Positions", Proceedings of International Conference on Acoustics, Speech, and Signal Processing, vol. IV, 1997, pp. 2749-2752.

* cited by examiner

DETECTION OF VIEW MODE

The invention relates to a switchable display device which is arranged to switch a portion of the display device between a single-view mode and a multi-view mode, the display device comprising:

receiving means for receiving an information signal, the information signal having a format comprising structured elements having respective luminance values and corresponding distance indicators;

light generating means for generating light on basis of the information signal; and optical means for transferring the generated light in dependence of an actual view mode of the portion of the display device, the actual view mode being either the single-view mode or the multi-view mode.

The invention further relates to a method of view mode detection for a switchable display device which is arranged to switch a portion of the display device between a single-view mode and a multi-view mode, the display device comprising:

receiving means for receiving an information signal, the information signal having a format comprising structured elements having respective luminance values and corresponding distance indicators;

light generating means for generating light on basis of the information signal; and optical means for transferring the generated light in dependence of an actual view mode of the portion of the display device, the actual view mode being either the single-view mode or the multi-view mode.

The invention further relates to a computer program product to be loaded by a computer arrangement, comprising instructions to detect a view mode for a switchable display device which is arranged to switch a portion of the display device between a single-view mode and a multi-view mode, the display device as described above.

The invention further relates to an information signal having a format comprising structured elements having respective luminance values and corresponding distance indicators.

The invention further relates to a data carrier comprising such an information signal.

Since the introduction of display devices, a realistic 3D display device has been a dream for many. Many principles that should lead to such a display device have been investigated. Some principles try to create a realistic 3D object in a certain volume. For instance, in the display device as disclosed in the article "Solid-state Multi-planar Volumetric Display", by A. Sullivan in proceedings of SID'03, 1531-1533, 2003, information is displaced at an array of planes by means of a fast projector. Each plane is a switchable diffuser. If the number of planes is sufficiently high the human brain integrates the picture and observes a realistic 3D object. This principles allows a viewer to look around the object within some extend. In this display device all objects are (semi-) transparent.

Many others try to create a 3D display device based on binocular disparity only. In these systems the left and right eye of the viewer perceives another image and consequently, the viewer perceives a 3D image. An overview off these concepts can be found in the book "Stereo Computer Graphics and Other True 3D Technologies", by D. F. McAllister (Ed.), Princeton University Press, 1993. A first principle uses shutter glasses in combination with for instance a CRT. If the odd frame is displayed, light is blocked for the left eye and if the even frame is displayed light is blocked for the right eye.

Display devices that show 3D without the need for additional appliances are called auto-stereoscopic display devices.

A first glasses-free display device comprises a barrier to create cones of light aimed at the left and right eye of the viewer. The cones correspond for instance to the odd and even sub-pixel columns. By addressing these columns with the appropriate information, the viewer obtains different images in his left and right eye if he is positioned at the correct spot, and is able to perceive a 3D picture.

A second glasses-free display device comprises an array of lenses to image the light of odd and even sub-pixel columns to the viewer's left and right eye.

The disadvantage of the above mentioned glasses-free display devices is that the viewer has to remain at a fixed position. To guide the viewer, indicators have been proposed to show the viewer that he is at the right position. See for instance U.S. Pat. No. 5,986,804 where a barrier plate is combined with a red and green led. In case the viewer is well positioned he sees a green light, and a red light otherwise.

To relieve the viewer of sitting at a fixed position, multi-view auto-stereoscopic display devices have been proposed. See for instance U.S. patents 60/064,424 and US20000912. In the display devices as disclosed in U.S. 60/064,424 and US20000912 a slanted lenticular is used, whereby the width of the lenticular is larger than two sub-pixels. In this way there are several images next to each other and the viewer has some freedom to move to the left and right.

A drawback of auto-stereoscopic display devices is the resolution loss incorporated with the generation of 3D images. It is advantageous that those display devices are switchable between a 2D and 3D mode, i.e. a single-view mode and a multi-view mode. If a relatively high resolution is required, it is possible to switch to the single view mode since that has higher resolution.

An example of such a switchable display device is described in the article "A lightweight compact 2D/3D autostereoscopic LCD backlight for games, monitor and notebook applications" by J. Eichenlaub in proceedings of SPIE 3295, 1998. It is disclosed that a switchable diffuser is used to switch between a 2D and 3D mode. Another example of a switchable auto-stereoscopic display device is described in WO2003015424 where LC based lenses are used to create a switchable lenticular.

In principle it is possible to switch the entire display device from 2D to 3D and vice versa. Alternatively, only a portion of the display device is switched. In order to switch between the view modes, appropriate control information is required as input.

It is an object of the invention to provide a switchable display device of the kind described in the opening paragraph which is arranged to determine the required actual view mode of the portion of the display device in a relatively easy way.

This object of the invention is achieved in that the switchable display device comprises mode detection means for detecting the actual view mode of the portion of the display device on basis of the respective distance indicators.

Alternatives for the words single-view mode and multi-view mode are two-dimensional (2D) mode and three-dimensional (3D) mode.

An information signal having a format comprising structured elements having respective luminance values and corresponding distance indicators is known in the prior art as a multi view format. For instance as 3-D video format RGBD=Red, Green, Blue, Depth, or as "image+depth" or frame/z-buffer. The z-buffer (also known as z-map, depth-map or D component) accompanies a normal 2D image, which in this context is then also referred to as frame buffer. The frame-buffer stores color/luminance values for every pixel, the z-buffer stores the z-position of every pixel. So, in this context with structured elements is meant data elements corresponding to pixels, having luminance values and corresponding distance indicators. Typically, the information signal as used in the prior art comprises distance indicators which are equal to values of a predetermined range of values, i.e. ranging from a first predetermined value to a second predetermined value.

According to the invention, the information signal is coded such that the distance indicators represent two different aspects: view mode and distance. The mode detection means according to the invention is arranged to interpret both aspects of the distance indicator. The actual value of a particular distance indicator indicates whether a single-view or a multi-view mode is required for a portion of a display device in which a light generating source is located which is arranged to generate an amount of light on basis of the corresponding luminance value. The actual value of the particular distance indicator may also be used as actual depth indicator for rendering. Typically, the actual depth value is irrelevant if the distance indicator indicates that the view mode corresponds to single-mode, since in single-mode there is only one depth.

It will be clear that using an information signal which is known as such in a new and inventive way according to the invention is advantageous, since backward compatibility is as issue. Systems according to the prior art are arranged to generate for instance RGBD data, to transmit, to receive, to store or to process such data. Switchable display devices according to the invention are additionally arranged to switch a portion of the display device to a requested actual view mode on basis of an additional interpretation of the values of the distance indicators. That means that known physical connections between systems, e.g. a data source and a switchable display device which are arranged to transfer for instance RGBD data can also be used for indicating a required actual display mode.

In an embodiment of the display device according to the invention, the mode detection means is arranged to detect that:

the actual view mode of the portion of the display device corresponds to single-view mode if a first one of the distance indicators corresponding to the portion of the display device has a value which is equal to a first value of a first set of predetermined values; and the actual view mode of the portion of the display device corresponds to multi-view mode if the first one of the distance indicators corresponding to the portion of the display device has a value which is equal to a first value of a second set of predetermined values.

Preferably, the first set of predetermined values comprises only one element, e.g. the predetermined value zero. Alternatively, that element equals a relatively high number compared with a range of numbers for the second set of predetermined values or a relatively low number compared with a range of numbers for the second set of predetermined values.

It will be clear that alternatives are possible to make a distinction between values indicating a single-view mode and a multi-view mode. Below a number of examples is given. This list of examples is not exhaustive.

| Value of distance indicator corresponding to single-mode | Value of distance indicator corresponding to multi-mode |
|---|---|
| 0 (zero) | [1, 255], i.e. values ranging from 1 to 255 |
| Maximum positive integer | [1, 255], i.e. values ranging from 1 to 255 |
| Maximum negative integer | [1, 255], i.e. values ranging from 1 to 255 |
| Any negative number | Any positive number |
| Any positive number | Any negative number |
| Any odd number | Any even number |
| Any even number | Any odd number |

It is a further object of the invention to provide a method of the kind described in the opening paragraph to determine the required actual view mode of the portion of the display device in a relatively easy way.

This object of the invention is achieved in that the method comprises detecting the actual view mode of the portion of the display device on basis of the respective distance indicators.

It is a further object of the invention to provide a computer program product of the kind described in the opening paragraph to determine the required actual view mode of the portion of the display device in a relatively easy way.

This object of the invention is achieved in that the computer program product, after being loaded, provides said processing means with the capability to carry out detecting the actual view mode of the portion of the display device on basis of the respective distance indicators.

It will be clear that the computer program may run on a display device. Alternatively the computer program may run on a separate apparatus which receives the information signal and provides both visual information and actual view mode information to a display device to which the separate apparatus is connected.

It is a further object of the invention to provide a signal of the kind described in the opening paragraph from which the required actual view mode of the portion of the display device can be determined in a relatively easy way.

This object of the invention is achieved in that the actual view mode of the portion of the display device is represented by the distance indicators.

It is a further object of the invention to provide a data carrier of the kind described in the opening paragraph from which the required actual view mode of the portion of the display device can be determined in a relatively easy way.

This object of the invention is achieved in that the actual view mode of the portion of the display device is represented by the distance indicators.

A data carrier may be an optical storage device like a CD, CD-ROM, CD-RW or DVD. Alternatively, a data carrier is based on solid state or tape.

Modifications of switchable display device and variations thereof may correspond to modifications and variations thereof of the information signal, the data carrier, the method and the computer program product, being described.

These and other aspects of the switchable display device, of the information signal, the data carrier, the method and the computer program product, according to the invention will become apparent from and will be elucidated with respect to the implementations and embodiments described hereinafter and with reference to the accompanying drawings, wherein:

FIG. 1 schematically shows an embodiment of the switchable display device according to the invention; and FIGS. 2A-2D schematically show a data carrier comprising an information signal and the corresponding views of the switchable display device.

FIG. 1 schematically shows an embodiment of the switchable display device 100 according to the invention. The switchable display device 100 is arranged to switch between view modes. In the single-view mode, also called 2D view mode only one image is generated. In other words, in the single-view mode a single view is generated which can be viewed in a viewing cone with a relatively large viewing angle. In the multi-view mode, also called 3-D view mode, multiple images are generated. These images can be viewed in different viewing cones, each having a viewing angle which is substantially smaller than the said viewing cone. For example, the number of views in the multi-view mode is 9. Typically, the viewing cones are such that a viewer which is positioned appropriately relative to the display device 100 is presented with a first view to his left eye and a second view, which is correlated to the first view, to his right eye resulting in a 3-D impression.

Alternatively, the different views are not correlated and a first viewer perceives a first view only and a second viewer perceives a second view only. In this case, the two viewers can watch their own images simultaneously.

The switchable display device 100 is arranged to switch completely or only partially, i.e. the entire display device 100 is in the single view mode or the multi-view mode, or alternatively a first portion of the display device 100 is in the single-view mode while a second portion is in the multi-view mode. For instance, most of the display device is in single-view mode, while a window is in multi-view mode.

The display device 100 comprises:

a receiving unit 102 for receiving an information signal which is provided at the input connector 106;

a light generating unit 108 for generating light on basis of the information signal;

an optical directing unit 110 for transferring the generated light in dependence of an actual view mode of the display device;

an image rendering unit 112 which is arranged to compute driving values to be provided to the light generating unit 108 on basis of the information signal as received by the receiving unit 102; and a detection unit 104 for detecting the actual view mode of a portion of the display device on basis of the values of the corresponding distance indicators in the information signal.

The information signal has a format comprising structured elements having respective luminance values and corresponding distance indicators. For instance the information signal is a video signal with an RGBD format. It should be noted that luminance is represented by the RGB components. The D (depth) component corresponds to distance indicators. Alternatively the YUVD format is used to provide the display device 100 with input. The information signal may be a broadcast signal received via an antenna or cable but may also be a signal from a storage device like a VCR (Video Cassette Recorder) or Digital Versatile Disk (DVD).

The light generating unit 108 comprises a matrix of light generating elements which are modulated on basis of a driving signal which is based on luminance component of the information signal. Preferably the light generating unit 108 is based on an LCD.

The optical directing unit 110 may be based on controllable parallax barriers. With controllable is meant that the amount of light absorption is not fixed. For instance in a first state the parallax barriers are turned off, meaning that they do not absorb the generated light. In that first state the switchable display device 100 is in the single view mode. In a second state the parallax barriers are turned on, meaning that they absorb the light in certain directions. In that second state the switchable is device 100 is in the multi-view mode. Optionally, the position of the parallax barriers is controllable, enabling directing light in response of eye tracking.

Preferably, the optical directing unit 110 is based on lenses. In order to switch between the single view mode and the multi view mode the optical directing unit 110 optionally comprises a diffuser. Alternatively, the optical directing unit 110 comprises switchable lenses or comprises means which are arranged to cooperate with the lenses arranged to compensate for the effect of the lenses.

The image rendering unit 112 is arranged to compute driving values to be provided to the light generating unit 108 on basis of the information signal as received by the receiving unit 102. The driving values may be directly based on luminance values of the information signal. That means that there is a one-to-one relation between luminance values as received and output values of image rendering unit 112. In that case the image rendering unit is simply passing values. However, there maybe a difference in image resolution between the image data as received and the resolution of the image display device. In that case an image scaling is required.

It may also be that the image data as received comprises a single view and corresponding depth values but a multi view mode is required. In that case a number of additional views must be computed on basis of the single view as received and the corresponding depth values, i.e. distance indicators. An example of this type of rendering are described in the article "Synthesis of multi viewpoint images at non-intermediate positions" by P. A. Redert, E. A. Hendriks, and J. Biemond, in Proceedings of International Conference on Acoustics, Speech, and Signal Processing, Vol. IV, ISBN 0-8186-7919-0, pages 2749-2752, IEEE Computer Society, Los Alamitos, Calif., 1997. Alternatively, the rendering is as described in "High-quality images from 2.5D video", by R. P. Berretty and F. E. Ernst, in Proceedings Eurographics, Granada, 2003, Short Note 124.

The detection unit 104 is arranged to detect the actual view mode for each sub-pixel, i.e. independently controllable light generating element of the light generating unit 108, on basis of the values of the corresponding distance indicators in the information signal. If the values are in a first predetermined range, then the corresponding sub pixels have to be rendered in single view mode. If the values are in a second predetermined range, than the corresponding sub pixels have to be rendered in multi view mode.

The receiving unit 102, the image rendering unit 112 and the detection unit 104 may be implemented using one processor. Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

The switchable display device 100 according to the invention might e.g. be a TV. Optionally the image processing apparatus 100 comprises storage means, like a hard-disk or means for storage on removable media, e.g. optical disks.

FIGS. 2A-2D schematically show a data carrier 200 comprising an information signal and the corresponding views of the switchable display device 100. The data carrier 200 comprises an information signal having a format comprising structured elements having respective luminance values 234-244 and corresponding distance indicators 202-212. The luminance values are kept in so-called RGB values. The actual values are not indicated in the FIGS. 2A-2D. The distance indicator values are indicated in FIGS. 2A-2D. For instance in FIG. 2A the actual values of the distance indicators are mutually equal, i.e. all equal to zero.

The data carrier 200 may be an optical disk comprising the information signal as such. Alternatively, the information is encoded in a particular format.

The switchable display device 100 comprises a number of light generating elements 214-224. Each of these light generating elements may contribute to a particular view. The actual views are indicated in FIGS. 2A-2D. For instance in FIG. 2A the actual view numbers are mutually equal, i.e. view number 1 in this case. That means that there is only one view, i.e. the entire display device is in single view mode.

Figure 2A:
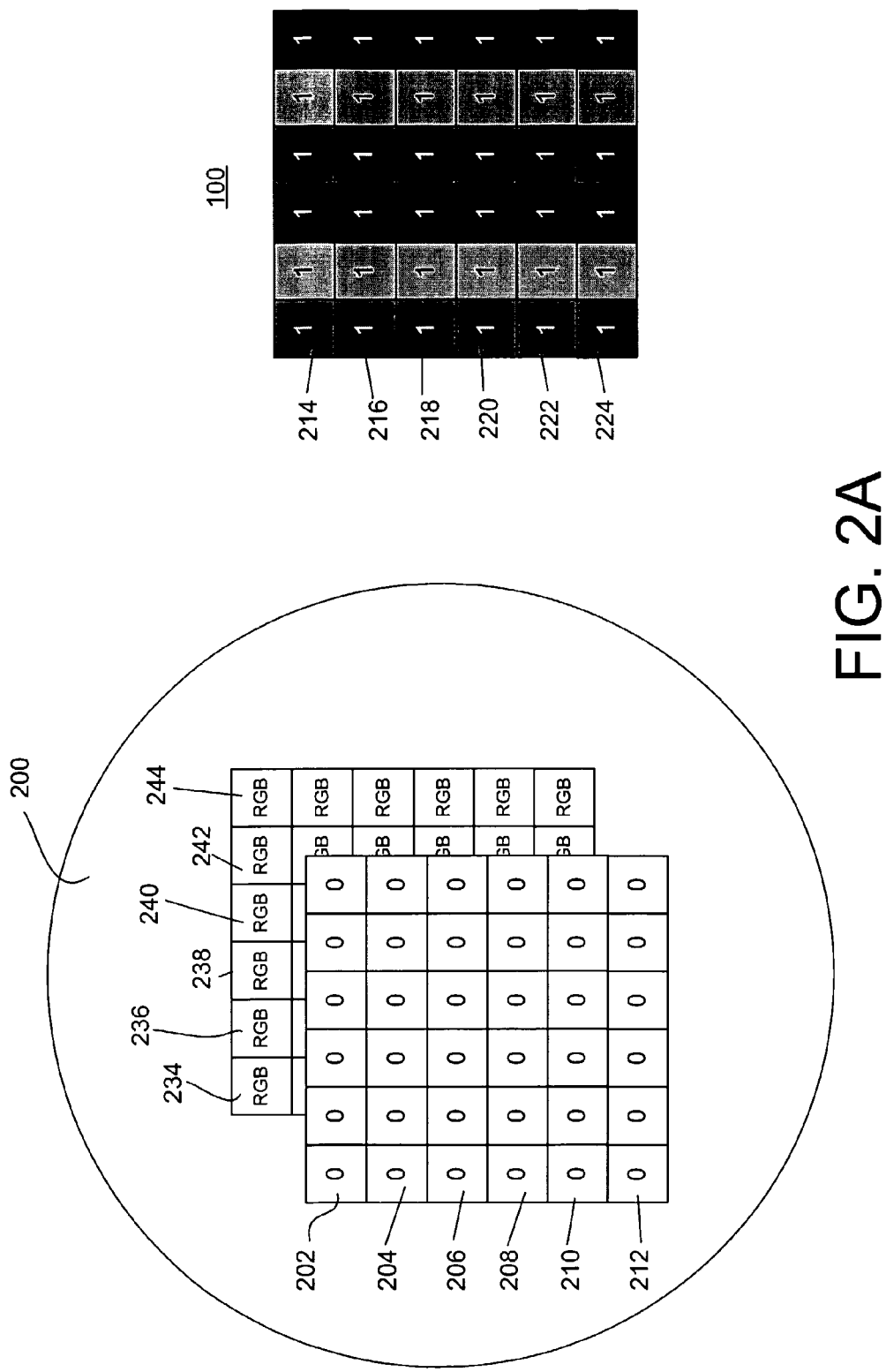

In FIG. 2A a first structured element of the information signal comprising a first luminance value 234 and a first distance indicator 202 directly map to a first light generating element 214. The switchable display device 100 according to the invention is arranged to determine the actual view mode for the first light generating element 214 on basis of the corresponding first distance indicator 202. In this case the value of the first distance indicator 202 is equal to zero meaning that a single view mode is required. The optical directing unit 110 is controlled accordingly and the appropriate driving value is provided to the first light generating element 214.

Figure 2B:
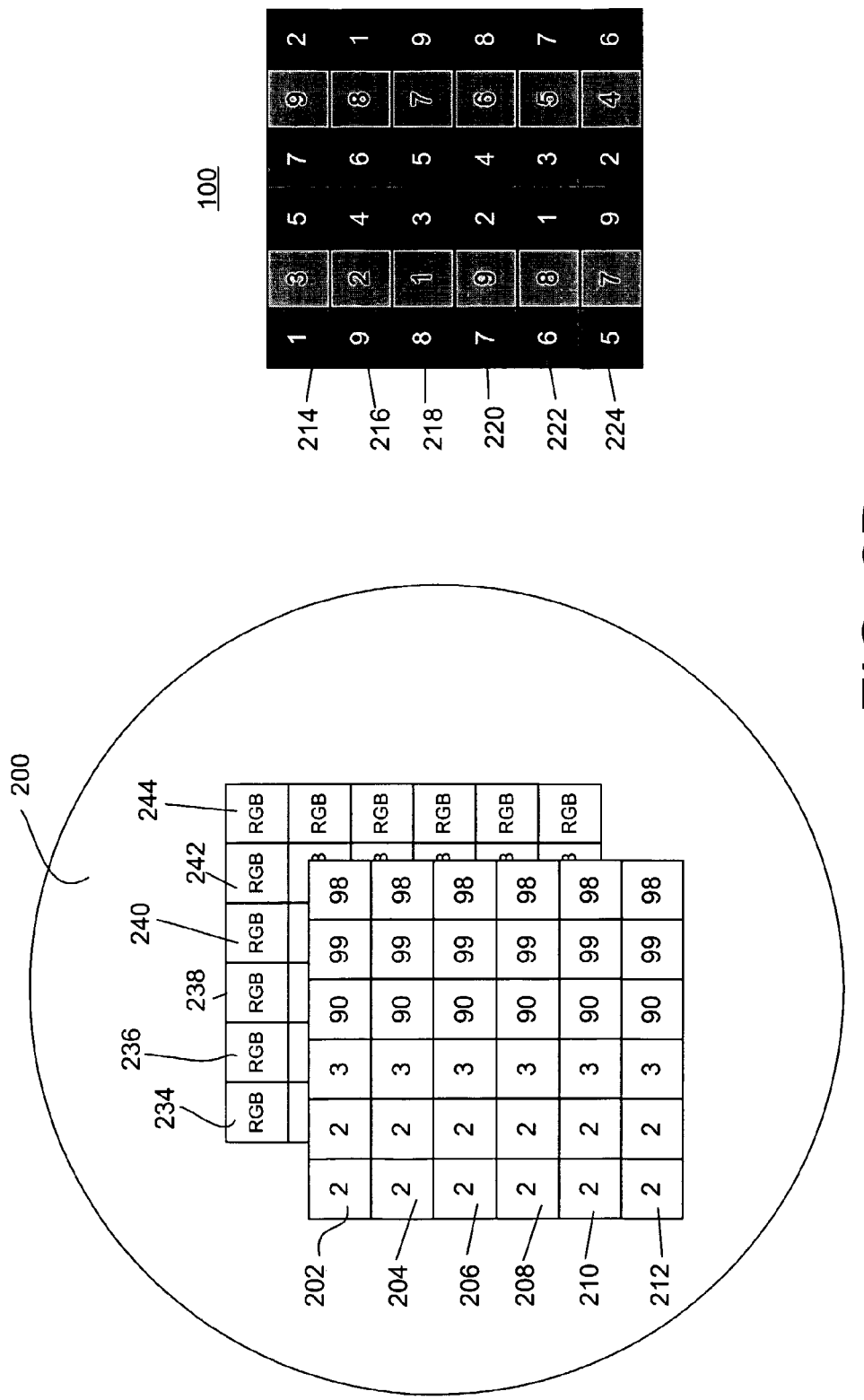

In FIG. 2B is indicated that the values of the distance indicators are mutually different. That means that a multi view mode is required and as a consequence the optical directing unit 110 is controlled accordingly. In FIG. 2B is clearly indicated that the different light generating elements contribute to different views 1-9. FIG. 2B schematically shows that the complete display device 100 is in multi view mode.

Figure 2C:
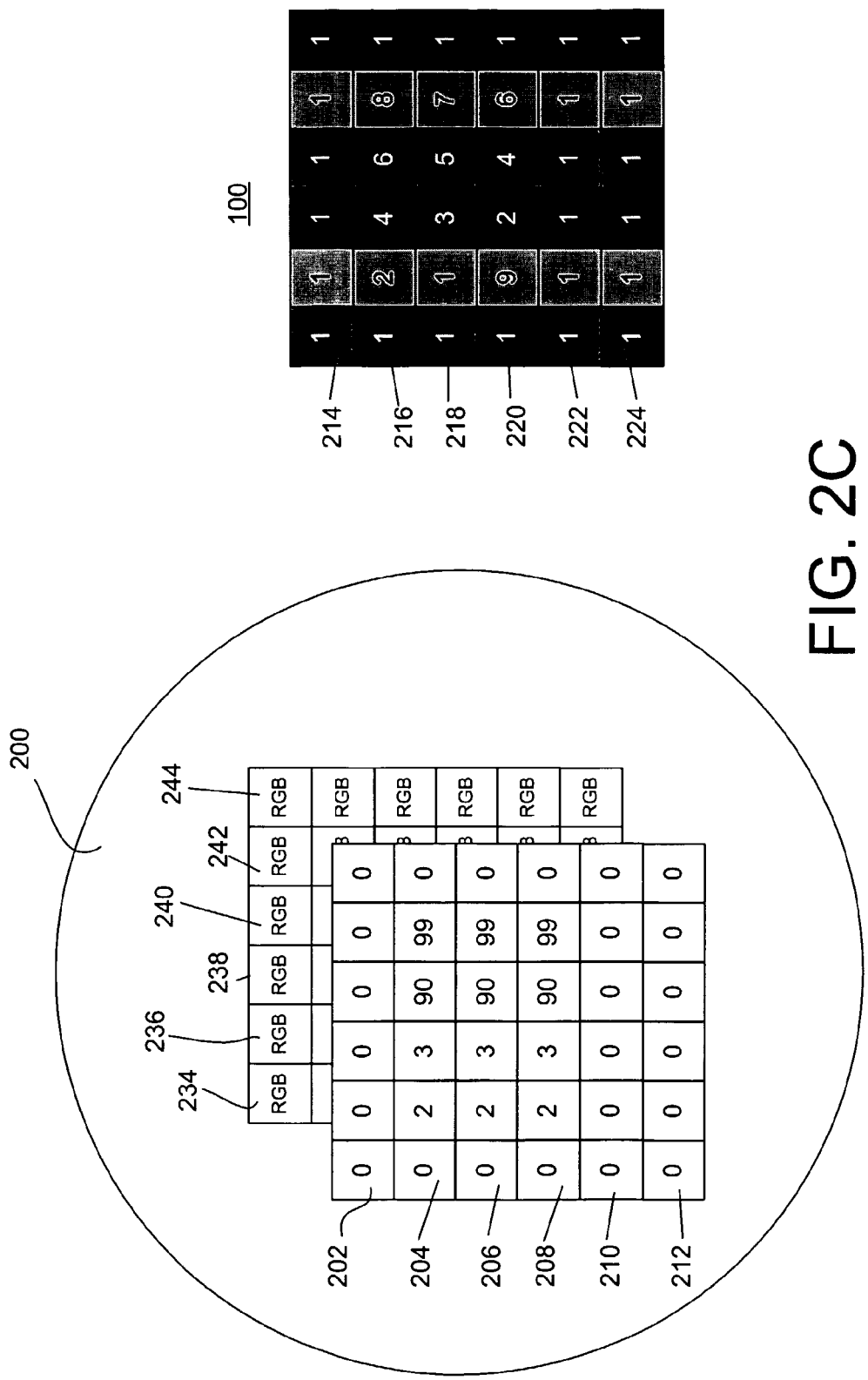

In FIG. 2C is indicated that a portion of the values of the distance indicators are mutually equal and are all in a first predetermined range. The corresponding light directing elements contribute to the same view, i.e. single view mode. Besides that there is a window of light generating elements being in the multi view mode.

Figure 2D:
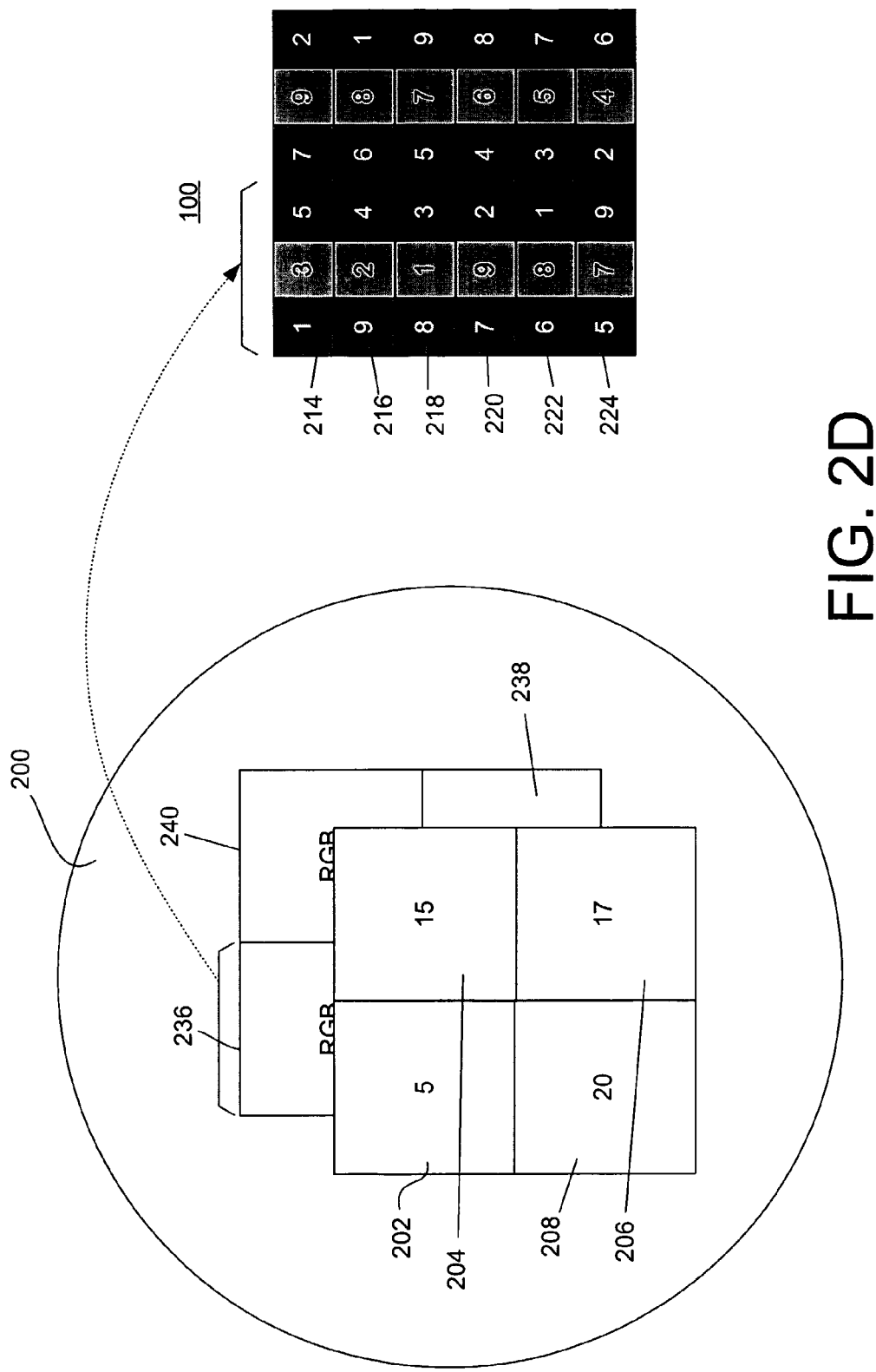

In the examples as described in connection with the FIGS. 2A-2C there was a one-to-one relation between values of the information signal and the respective light generating elements. FIG. 2D schematically shows an example in which multiple views are created on basis of a single view as stored on a data carrier. The type of the rendering which is needed to achieve this is referred to above, in connection with FIG. 1.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware. The usage of the words first, second and third, etcetera do not indicate any ordering. These words are to be interpreted as names.

The invention claimed is:

1. A switchable display device which is arranged to switch a portion of the display device between a single-view mode and a multi-view mode, the display device comprising:
   a processor to receive an information signal, the information signal having a format comprising structured elements each structured element having respective luminance values and respective distance indicators, wherein said distance indicators represent depth indicators and an indicators of whether a single-view or a multi-view mode is required for a portion of the display device;
   light generating unit, wherein said light generating unit uses the information signal to generate light;
   optical unit, wherein said optical unit transfers the generated light in dependence of an actual view mode of the portion of the display device, the actual view mode being either the single-view mode or the multi-view mode;
   wherein said processor detects the actual view mode of the portion of the display device using the respective distance indicators; and
   wherein the processor is arranged to detect that,
   the actual view mode of the portion of the display device corresponds to single-view mode if a first one of the distance indicators corresponding to the portion of the display device has a value which is equal to a first value of a first set of predetermined values; and
   the actual view mode of the portion of the display device corresponds to multi-view mode if the first one of the distance indicators corresponding to the portion of the display device has a value which is equal to a first value of a second set of predetermined values.

2. A switchable display device as claimed in claim 1, whereby the first set of predetermined values comprises one element.

3. A switchable display device as claimed in claim 1, whereby the first value of the first set of predetermined values equals zero.

4. A switchable display device as claimed in claim 1, whereby the first value of the first set of predetermined values equals a higher number compared with a range of numbers for the second set of predetermined values.

5. A switchable display device as claimed in claim 1, whereby the first value of the first set of predetermined values equals a lower number compared with a range of numbers for the second set of predetermined values.

6. A method of view mode detection for a switchable display device which is arranged to switch a portion of the display device between a single-view mode and a multi-view mode, the method comprising steps of:
   receiving an information signal, the information signal having a format comprising structured elements each structured element having respective luminance values and respective distance indicators, wherein said distance indicators represent depth indicators and an indicators of whether a single-view or a multi-view mode is required for a portion of the display device;
   generating light using the information signal; and
   transferring the generated light in dependence of an actual view mode of the portion of the display device, the actual view mode being either the single-view mode or the multi-view mode, and
   detecting (1) the actual view mode of the portion of the display device using the respective distance indicators, (2) the actual view mode of the portion of the display device corresponds to single-view mode if a first one of the distance indicators corresponding to the portion of the display device has a value which is equal to a first value of a first set of predetermined values; and (3) the actual view mode of the portion of the display device corresponds to multi-view mode if the first one of the distance indicators corresponding to the portion of the display device has a value which is equal to a first value of a second set of predetermined values.

7. A non-transitory computer readable storage medium including a computer program including a set of instructions executable by a processor to detect a view mode for a switchable display device which is arranged to switch a portion of the display device between a single-view mode and a multi-view mode, the computer readable storage medium comprising:

code to receive an information signal, the information signal having a format comprising structured elements each structured element having respective luminance values and respective distance indicator, wherein said distance indicators represent depth indicators and an indicators of whether a single-view or a multi-view mode is required for a portion of the display devices;

code to generate light using the information signal;

code to transfer the generated light in dependence of an actual view mode of the portion of the display device, the actual view mode being either the single-view mode or the multi-view mode, and code to detect (1) the actual view mode of the portion of the display device using the respective distance indicators (2) the actual view mode of the portion of the display device corresponds to single-view mode if a first one of the distance indicators corresponding to the portion of the display device has a value which is equal to a first value of a first set of predetermined values, and (3) the actual view mode of the portion of the display device corresponds to multi-view mode if the first one of the distance indicators corresponding to the portion of the display device has a value which is equal to a first value of a second set of predetermined values.

* * * * *